UNITED STATES PATENT OFFICE.

WM. E. LOCKWOOD, OF PHILADELPHIA, PENNSYLVANIA, ASSIGNEE, BY MESNE ASSIGNMENTS, OF WALTER HUNT.

IMPROVEMENT IN SHIRT-COLLARS.

Specification forming part of Letters Patent No. 11,376, dated July 25, 1854; Reissue No. 1,867, dated February 7, 1865.

DIVISION C.

*To all whom it may concern:*

Be it known that I, WILLIAM E. LOCKWOOD, of Philadelphia, Pennsylvania, am the owner of certain Letters Patent for an Improvement in Shirt-Collars, granted to WALTER HUNT on the 25th day of July, 1854; that I deem the said patent inoperative and invalid by reason of a defective specification; and that the following is a full, clear, and exact description of that part of the said invention which consists of a shirt-collar in which white paper is used to imitate starched linen, and which has the desired shape imparted to it by formers applied under pressure.

The said WALTER HUNT made collars of stiff white paper, and polished or enameled the surface by calender-rolls, by rubbing with an agate burnisher, or by other suitable means, the collar being shaped by formers applied under pressure. Deeming the paper itself too fragile and liable to tear, especially at the button-holes, he took sheets of thin white paper, and by means of paste, glue, or other appropriate sizing secured one to one side and the other to the opposite side of thin white cotton muslin. The fabric thus composed had a smooth and polished or enameled surface imparted to it by passing it between calender-rollers or by other suitable means. The collars or other articles of wearing-apparel were then cut or stamped out from this fabric and provided with suitable button-holes. In order that they might be made to conform to the shape of the wearer's neck, the paper collars were finally pressed between forms of appropriate shape.

It is evident that the invention is adapted to shirt-bosoms, wristbands, &c.

I claim as the invention of the said WALTER HUNT and as a new manufacture—

A shirt-collar in which white paper is used to imitate starched linen, and which is made of the desired shape by dies or formers applied under pressure.

In testimony whereof I have signed my name to this specification before two subscribing witnesses.

WILLIAM E. LOCKWOOD.

Witnesses:
HENRY HOWSON,
JOHN WHITE.